(12) United States Patent
Alster (10) Patent No.: US 6,360,166 B1
(45) Date of Patent: Mar. 19, 2002

(54) APPARATUS AND METHOD FOR REMOVING LOGS FROM A FORESTRY SITE

(75) Inventor: L. Gregory Alster, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/557,105

(22) Filed: Apr. 24, 2000

(51) Int. Cl.[7] .............................. G01C 21/00; G01S 5/00
(52) U.S. Cl. ................ 701/209; 701/207; 280/143-148; 280/400-402; 280/404; 280/487; 280/425.2; 280/491.1; 280/656; 414/339; 414/483; 414/460; 414/450; 410/80; 410/36; 410/37; 410/42; 410/52; 410/54; 410/87; 410/94; 410/121; 410/100; 410/122; 410/103; 105/404; 105/422; 105/160; 105/160.5; 105/355; 105/416; 105/414; 105/380-391
(58) Field of Search ................................. 280/143–148, 280/401, 402, 487, 404, 400, 656, 491.1, 425.2; 414/339, 483, 460, 450, 540, 626, 911, 23; 410/80, 36, 37, 42, 52, 54, 87, 94, 121, 122, 100, 103; 294/82.14, 82.24, 74; 105/404, 422, 160, 160.5, 355, 416, 380–391, 414; 212/87; 701/209, 207

(56) References Cited

U.S. PATENT DOCUMENTS

| | | | | |
|---|---|---|---|---|
| 2,646,178 A | * | 1/1953 | Alvare | 214/38 |
| 3,486,645 A | * | 12/1969 | Hearn | 214/38 |
| 3,706,464 A | * | 12/1972 | Burrows et al. | 280/401 |
| 4,005,779 A | * | 2/1977 | Andrews | 212/7 |
| 4,055,316 A | * | 10/1977 | Chipper et al. | 244/33 |
| 4,795,135 A | * | 1/1989 | Scott | 254/327 |
| 5,110,149 A | * | 5/1992 | Dahlstrom | 280/401 |
| 5,156,506 A | * | 10/1992 | Bailey | 410/100 |
| 5,323,711 A | * | 6/1994 | Stephenson, Jr. | 105/380 |
| 5,494,309 A | * | 2/1996 | Roy | 280/401 |
| 5,580,211 A | * | 12/1996 | Mengel | 414/786 |
| 5,597,191 A | * | 1/1997 | McPhee et al. | 294/82.14 |
| 5,876,174 A | * | 3/1999 | Arsenault | 414/460 |
| 5,904,364 A | * | 5/1999 | Wylezinski et al. | 280/401 |

* cited by examiner

*Primary Examiner*—Tan Nguyen
*Assistant Examiner*—Ronnie Mancho
(74) *Attorney, Agent, or Firm*—Steve D. Lundquist

(57) ABSTRACT

An apparatus and method for removing logs from a forestry site. The apparatus and method includes a primary mobile machine having means attached to a rearward portion thereof for holding a first end of a first log cluster. The apparatus and method also includes a first secondary mobile machine with a first end having means for holding a second end of the first log cluster, and a second end having means for holding a first end of a second log cluster. The primary mobile machine and the first secondary mobile machine are interconnected by the first log cluster.

32 Claims, 7 Drawing Sheets

APPARATUS AND METHOD FOR REMOVING LOGS FROM A FORESTRY SITE

TECHNICAL FIELD

This invention relates generally to an apparatus and method for hauling cut timber from a forestry site and, more particularly, to an apparatus and method for removing logs from a forestry site which minimizes environmental damage and increases productivity.

BACKGROUND ART

Typically, in forestry operations, trees are felled and de-limbed at locations within a forestry site which do not have ready access to transportation routes, such as roads. These situations require hauling the cut timber to the roads, where trucks wait to be loaded. The trucks may then transport the loaded timber to mills, inventory yards, or some other desired location.

The felled trees are often removed from the forestry site by dragging them out with skidders, or some other suitable machine. This process can cause severe damage to the terrain, for example, by creating ruts as the trees are dragged.

Alternatively, a logging road may be created to remove the trees with larger equipment, or even to allow the road trucks to come to the forestry site. The creation of a logging road requires some initial damage to the environment by the process of clearing enough trees and brush to make room for the road. In addition, the heavy machines which travel on the road tend to make ruts, especially under wet conditions.

A major objective of logging operations at a forestry site is to minimize disturbance to the tree stand and to minimize damage to the soil, thus keeping the forestry site as ecologically intact as possible. However, the damage created by the processes described above disturb the ecology of the site, and therefore continual maintenance and repair is required. The costs of maintenance and repair can be tremendous, and logging operations are often faced with the necessity of reducing these costs as much as possible.

It is therefore desired to remove cut timber from a forestry site in a manner that minimizes disturbance of the surrounding forest, minimizes disturbance of the soil, maintains a high level of productivity, and is not susceptible to weather conditions, e.g., wet conditions. It is also desired to remove cut timber from a forestry site in a manner that is efficient, productive, and economical.

The present invention is directed to overcoming one or more of the problems as set forth above.

DISCLOSURE OF THE INVENTION

In one aspect of the present invention an apparatus for removing logs from a forestry site is disclosed. The apparatus includes a primary mobile machine having means attached to a rearward portion thereof for holding a first end of a first log cluster. The apparatus also includes a first secondary mobile machine with a first end having means for holding a second end of the first log cluster, and a second end having means for holding a first end of a second log cluster. The primary mobile machine and the first secondary mobile machine are interconnected by the first log cluster.

In another aspect of the present invention an apparatus for removing logs from a forestry site is disclosed. The apparatus includes a primary mobile machine having a grapple tool pivotally attached to a rearward portion thereof, the grapple tool being adapted to hold a first end of a first log cluster. The apparatus also includes a first secondary mobile machine, including a first end having a fixed carrier rack connected, the fixed carrier rack being adapted to hold a second end of the first log cluster, and a second end having a grapple tool pivotally connected, the grapple tool being adapted to hold a first end of a second log cluster. The primary mobile machine and the first secondary mobile machine are interconnected by the first log cluster.

In another aspect of the present invention an apparatus for removing logs from a forestry site is disclosed. The apparatus includes a primary mobile machine having a grapple tool pivotally attached to a rearward portion thereof, the grapple tool being adapted to hold a first end of a log cluster. The apparatus also includes a plurality of secondary mobile machines, each secondary mobile machine including a first end having a fixed carrier rack connected, the fixed carrier rack being adapted to hold a second end of a log cluster preceding the secondary mobile machine, and a second end having a grapple tool pivotally connected, the grapple tool being adapted to hold a first end of another log cluster following the secondary mobile machine. The primary mobile machine and each of the secondary mobile machines are interconnected by the log clusters.

In another aspect of the present invention a primary mobile machine for guiding a plurality of secondary mobile machines from a forestry site is disclosed. The primary mobile machine includes a grapple tool pivotally attached to a rearward portion of the primary mobile machine, the grapple tool being adapted to hold a first end of a first log cluster, an engine for propulsion, a steering system, and a plurality of ground engaging members drivably connected to the engine, and controllably connected to the steering system. The primary mobile machine also includes a position determining system, a geographic information system, a communications system, and a processor adapted for receiving position information from the position determining system, determining a desired route to traverse from the geographic information system, and communicating commands to the secondary mobile machines.

In another aspect of the present invention a secondary mobile machine for removing logs from a forestry site is disclosed. The secondary mobile machine includes a first end having a fixed carrier rack connected, the fixed carrier rack being adapted to hold an end of a first log cluster forward of the secondary mobile machine, and a second end having a grapple tool pivotally connected, the grapple tool being adapted to hold an end of a second log cluster rearward of the secondary mobile machine. The secondary mobile machine also includes an engine for propulsion, at least one ground engaging member drivably connected to the engine, and a communications system located on the secondary mobile machine and adapted to receive desired speed commands from a primary mobile machine. The secondary mobile machine is adapted to be interconnected to the primary mobile machine by means of the first log cluster forward of the secondary mobile machine, and the secondary mobile machine is adapted to be guided from the forestry site by the primary mobile machine.

In another aspect of the present invention a method for removing logs from a forestry site is disclosed. The method includes the steps of a) attaching a first end of a first log cluster to a grapple tool pivotally connected to a rearward portion of a primary mobile machine, b) attaching a second end of the first log cluster to a fixed carrier rack connected to a forward portion of a first secondary mobile machine, c) attaching a first end of a second log cluster to a grapple tool pivotally connected to a rearward portion of the first secondary mobile machine, d) attaching a second end of the second log cluster to a fixed carrier rack connected to a forward portion of a second secondary mobile machine, and e) repeating steps c) and d) for each additional log cluster, using additional secondary mobile machines.

BEST MODE FOR CARRYING OUT THE INVENTION

Figure 1:
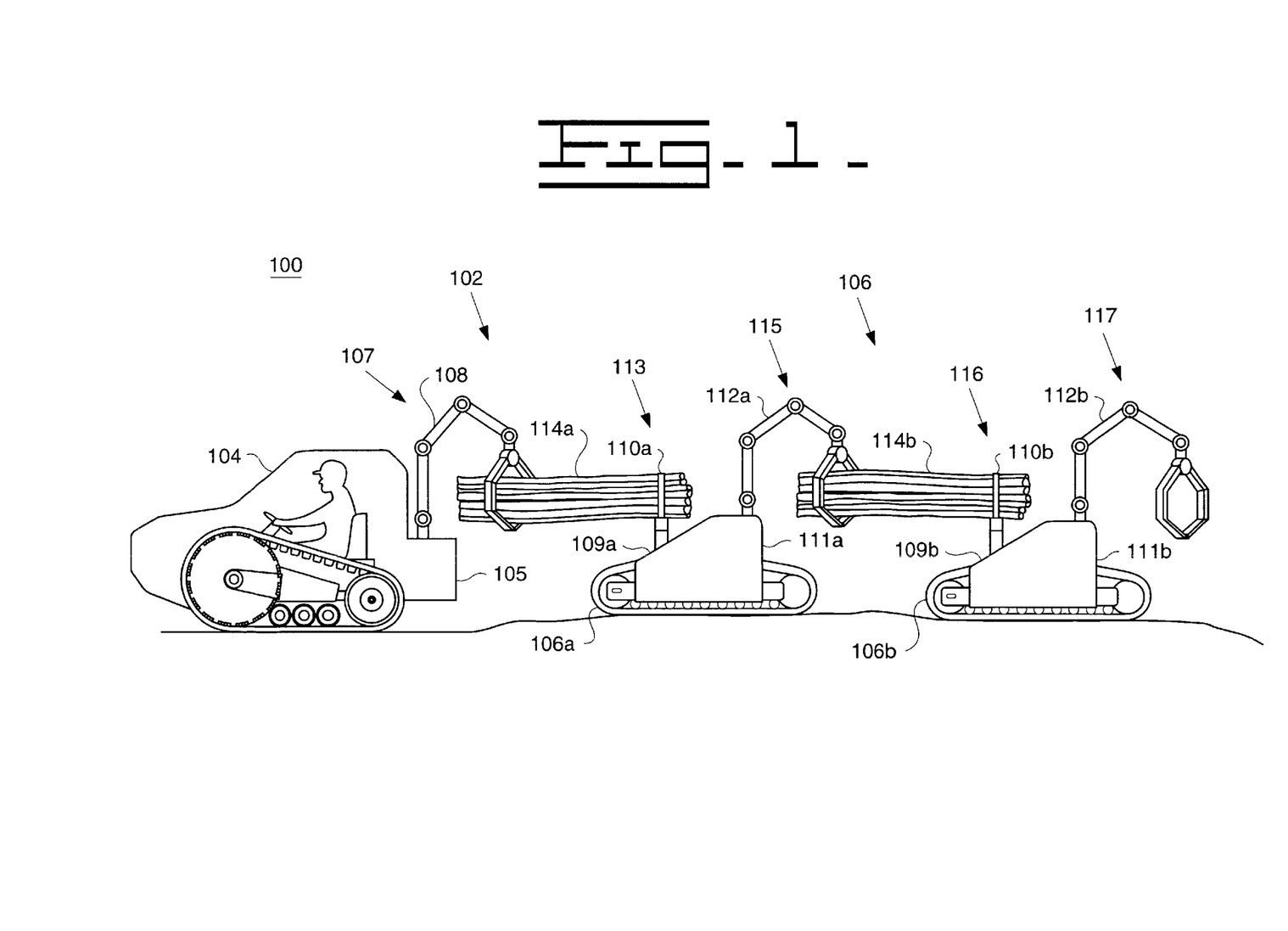
FIG. 1 is a diagrammatic illustration of a preferred embodiment of the present invention.
Figure 2:
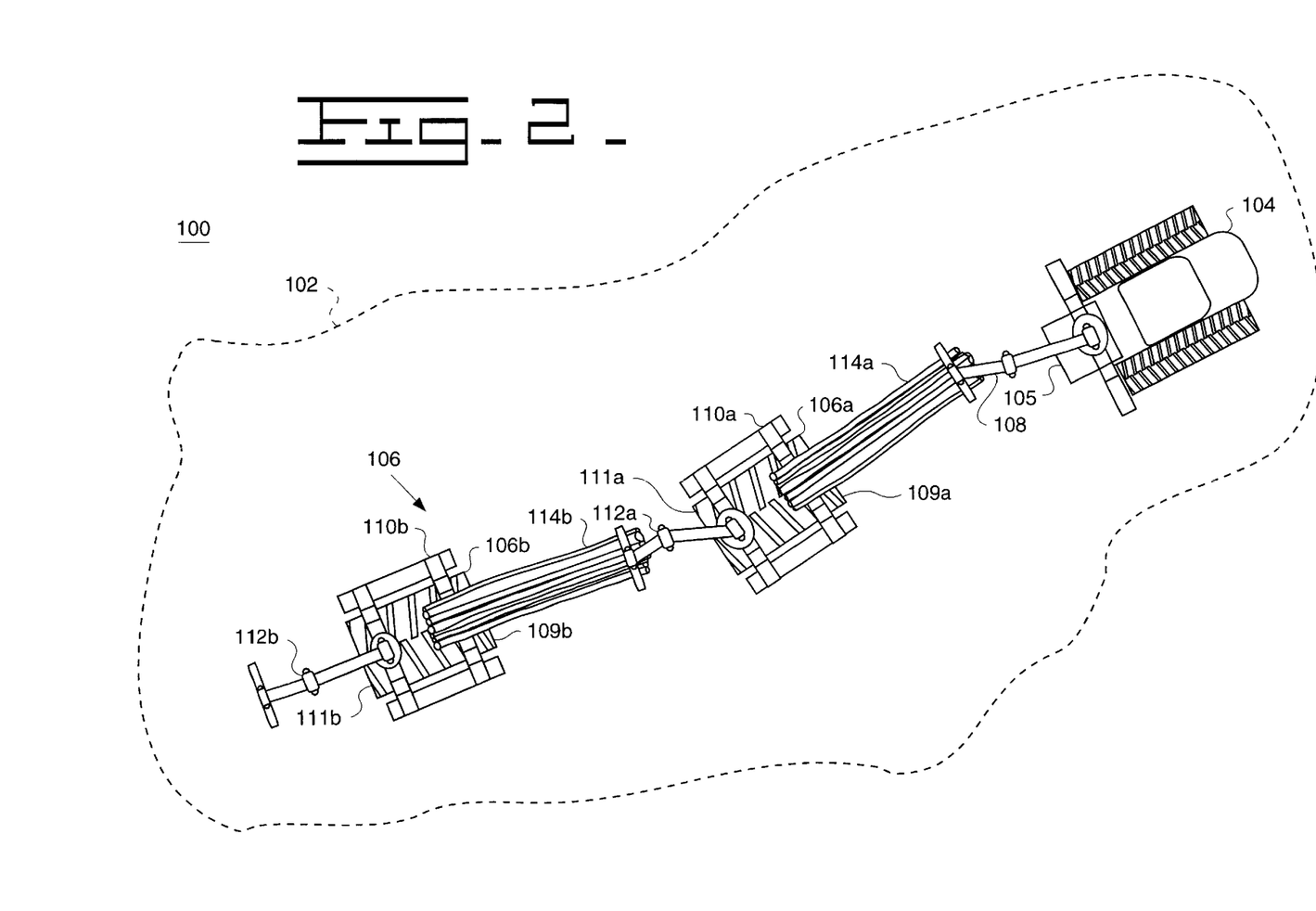
FIG. 2 is a diagrammatic illustration of a preferred embodiment of the present invention as viewed from above.

Referring to the drawings, and with particular reference to FIGS. 1 and 2, an apparatus 100 and method for removing logs from a forestry site 102 is shown. In the preferred embodiment, the apparatus 100 includes a primary mobile machine 104 and at least one secondary mobile machine 106. For example, in FIGS. 1 and 2, two secondary mobile machines 106a,106b are shown.

Preferably, the primary mobile machine 104 and the secondary mobile machines 106 are low profile machines having a narrow width, thus enabling them to maneuver readily throughout the forestry site 102 with minimal disturbance to the environment. In addition, the primary and secondary mobile machines 104,106 preferably are track-type machines, i.e., the ground engaging means for propulsion are tracks, preferably rubber-belted tracks. The use of tracks for mobility offers the advantages of good traction and minimal disturbance to the soil at the forestry site 102. However, other types of ground engaging members, such as wheels or combinations of tracks and wheels, could be used as well.

In the preferred embodiment, the primary mobile machine 104 is a manned machine, using an operator to navigate the primary mobile machine throughout the forestry site 102. In addition, the secondary mobile machines 106 are unmanned machines, thus requiring guidance by the primary mobile machine 104. Alternatively, the primary mobile machine 104 may be operated remotely or autonomously, as desired.

The primary mobile machine 104 has a rearward portion 105 which has means 107 attached for holding a first end of a log cluster 114. In one embodiment, shown in FIG. 1, the means 107 is a grapple tool 108 pivotally attached. The grapple tool 108 is adapted to hold a first end of the log cluster 114. For example, the grapple tool 108 on the primary mobile machine 104 in FIGS. 1 and 2 is shown holding a first end of a first log cluster 114a. Alternatively, the means 107 for holding the first end of the log cluster 114 may be some other suitable device, e.g., a clamshell gripper, a rack, and the like. Preferably, the means 107 for holding the first end of the log cluster 114 is pivotally mounted on the rearward portion 105 of the primary mobile machine 102 to allow the primary mobile machine 104 to guide the steering of the secondary mobile machines 106, as is described in more detail below.

A log cluster 114 is defined for purposes of the present invention as one or more logs which are clustered together for transport by the apparatus 100 of the present invention from the forestry site 102. Preferably, if a log cluster 114 includes two or more logs, each log in the log cluster 114 is substantially similar in length.

Each secondary mobile machine 106 has a first end 109 having a means 113,116 for holding a second end of a log cluster 114. For example, in FIGS. 1 and 2, a first secondary mobile machine 106a has a first end 109a having a means 113 for holding a second end of the first log cluster 114a, and a second secondary mobile machine 106b has a first end 109b having a means 116 for holding a second end of a second log cluster 114b.

FIG. 1 illustrates the means 113,116 on the secondary mobile machines 106 as fixed carrier racks 110 attached to the first ends 109. The second ends of the log clusters 114 rest on the fixed carrier racks 110, and may be secured to the racks 110 or may remain in position by the weight of the log clusters 114. In alternative embodiments, the means 113,116 may be other devices, e.g., grapple tools, clamshell grips, and the like. Preferably, the means 113,116 for holding the second ends of the log clusters 114 are mounted to the secondary mobile machines 106 in a fixed manner, thus causing steering changes made by the primary mobile machine 104 to force equivalent steering changes in the secondary mobile machines 106.

Each secondary mobile machine 106 has a second end 111 having means 115,117 for holding a first end of a log cluster 114. For example, in FIGS. 1 and 2, a first secondary mobile machine 106a has a second end 111a having a means 115 for holding a first end of the second log cluster 114b, and a second secondary mobile machine 106b has a second end 111b having a means 117 for holding a first end of a third log cluster (not shown).

FIG. 1 illustrates the means 115,117 on the secondary mobile machines 106 as grapple tools 112 pivotally attached to the second ends 111. The grapple tools 112 are adapted to hold the first ends of the log clusters 114. In alternative embodiments, the means 115,117 may be other devices, e.g., carrier racks, clamshell grips, and the like. Preferably, the means 115,117 for holding the first ends of the log clusters 114 are pivotally mounted to the secondary mobile machines 106 to guide the steering of subsequent secondary mobile machines 106.

Figure 3:
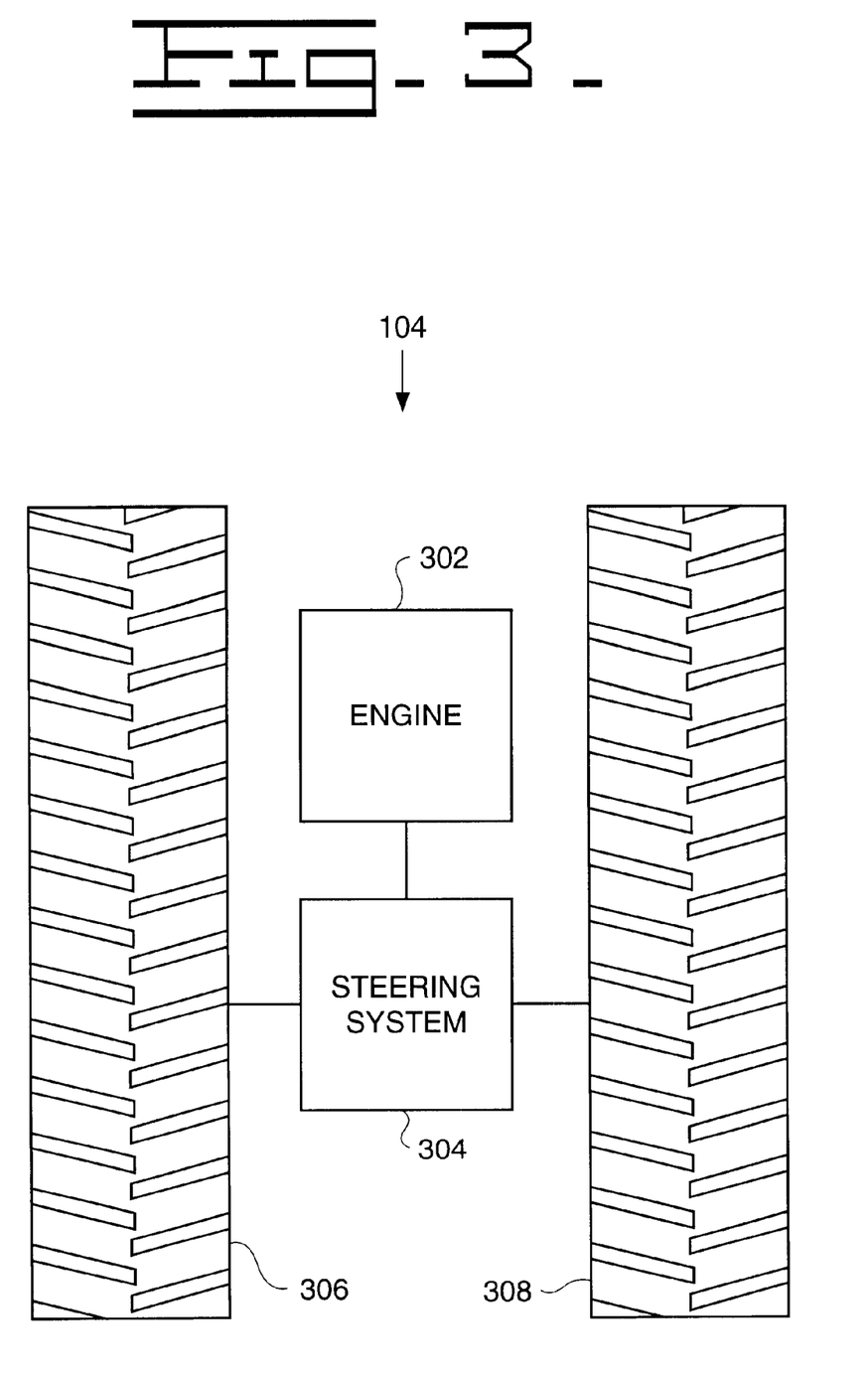
FIG. 3 is a block diagram illustrating a preferred embodiment of a primary mobile machine suitable for use in the present invention.

Referring to FIG. 3, the primary mobile machine 104 includes an engine 302 for propulsion and a steering system 304. In the preferred embodiment, the primary mobile machine 104 is a track-type machine, having a left track 306 and a right track 308. The left and right tracks 306,308 are drivably connected to the engine 302 and controllably connected to the steering system 304; that is, the engine 302 provides power to drive the tracks 306,308 to move the primary mobile machine 104, and the steering system 304 is adapted to control the tracks 306,308, thus steering the machine 104. The steering system 304 preferably is one of a differential steering system or a clutch/brake steering system, of which both concepts are well known in the art relevant to track-type machine steering.

Alternatively, the primary mobile machine 104 may use other types of ground engaging members, such as wheels, or a combination of tracks and wheels. It is noted that the steering system 304 would be of a type suited for use with the type of ground engaging members used.

Figure 4:
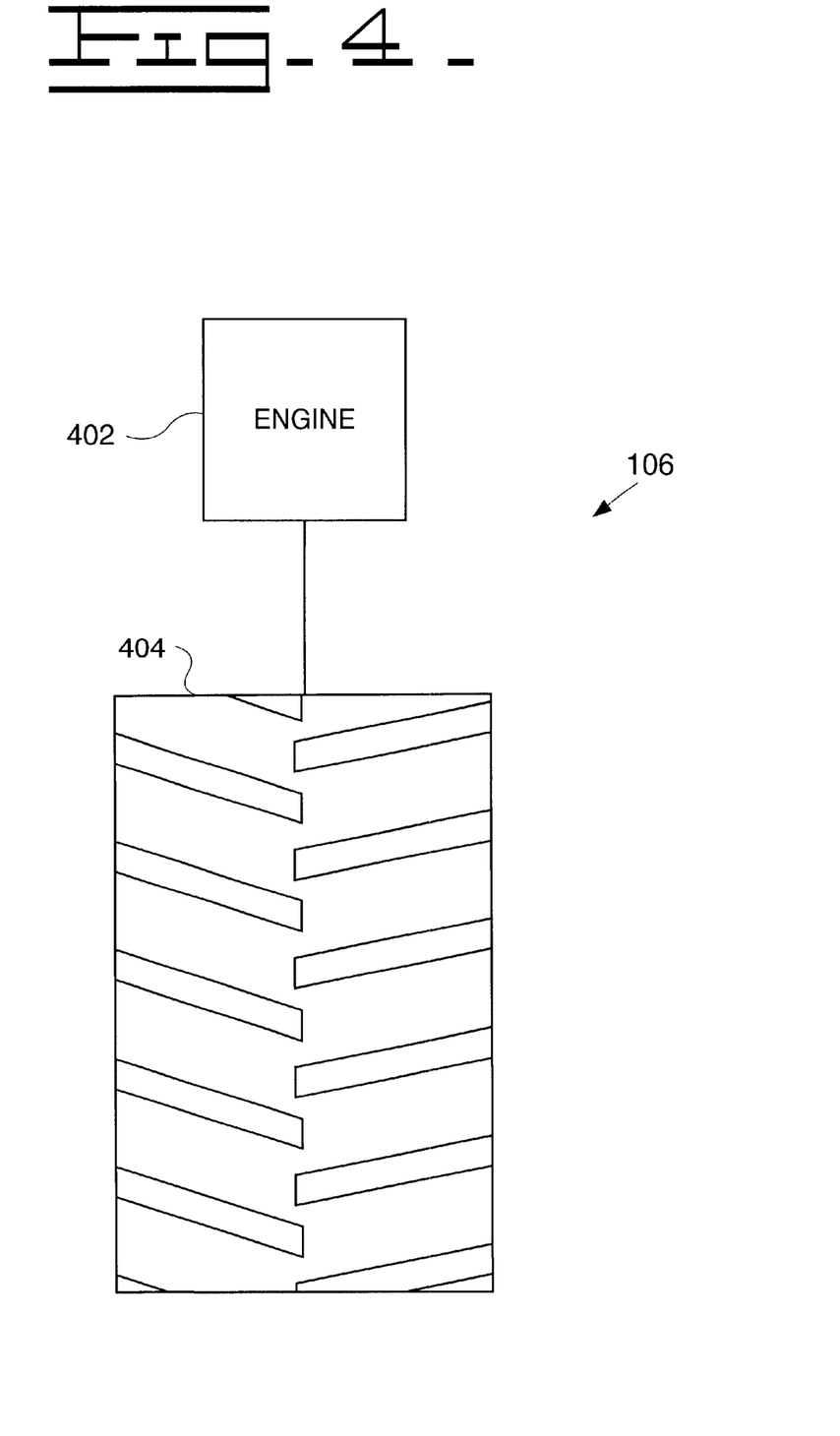
FIG. 4 is a block diagram illustrating a preferred embodiment of a secondary mobile machine suitable for use in the present invention.

Referring to FIG. 4, each secondary mobile machine 106 includes an engine 402 drivably connected to, in the preferred embodiment, a center track 404. The secondary mobile machine 106 is adapted to provide power for propulsion, but does not have the capability for steering. However, by incorporating a center track 404, the secondary mobile machine 106 is responsive to changes in steering performed by the primary mobile machine 104 by pivoting of the center track 404, thus changing direction. In addition, the center track 404 is preferably a wide-based track and provides minimum disturbance to the soil as the secondary mobile machine 106 traverses the forestry site 102. In an alternative embodiment, however, the secondary mobile machine 106 may use other types of ground engaging members, such as wheels.

Figure 5:
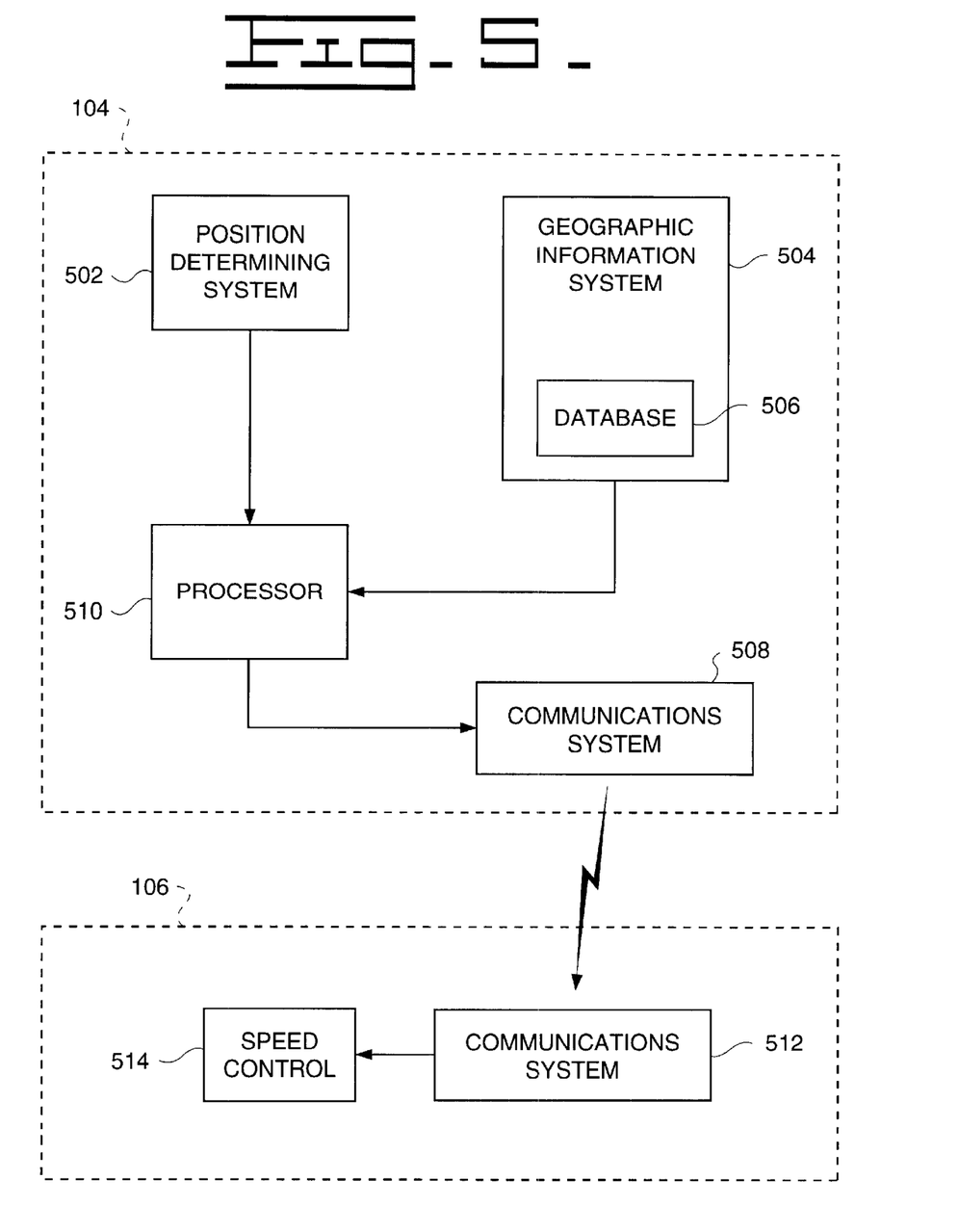
FIG. 5 is a block diagram illustrating a preferred embodiment of a system suitable for use in the present invention.

Referring to FIG. 5, a block diagram illustrating a preferred embodiment of the present invention is shown.

A position determining system 502, located on the primary mobile machine 104, is adapted to determine the position, in geographical coordinates, of the primary mobile machine 104. Preferably, the position determining system 502 is a global position satellite (GPS) system. However, other types of position determining systems, e.g., laser plane, dead reckoning, and the like, may be used as well, or in combination.

A geographic information system (GIS) 504, located on the primary mobile machine 104, is adapted to provide, update, and store geographic information relevant to the forestry site 102. Preferably, the GIS 504 includes a database 506 to store the information. In one embodiment, the GIS may be used to provide information to a display (not shown) for an operator of the primary mobile machine 104 to view.

A processor 510, located on the primary mobile machine 104, is adapted to receive position information from the position determining system 502, receive geographic information from the GIS 504, determine a desired route to travel, and deliver information to a communications system 508, located on the primary mobile machine 104.

The communications system 508 on the primary mobile machine 104 is adapted to communicate the information to a communications system 512, located on each secondary mobile machine 106. Preferably, the information being communicated includes commands which are determinative of a desired speed of travel. The desired speed of travel commands are delivered to a speed control 514, located on each secondary mobile machine 106, so that the primary mobile machine 104 and each secondary mobile machine 106 travel at a coordinated speed. The primary mobile machine 104, as it travels out of the forestry site 102, then guides the secondary mobile machines 106 by causing each secondary mobile machine 106 to change direction of travel as the primary mobile machine 104 changes direction of travel. This is accomplished through the log clusters 114 which are interconnected between the primary and secondary mobile machines 104,106.

Figure 6:
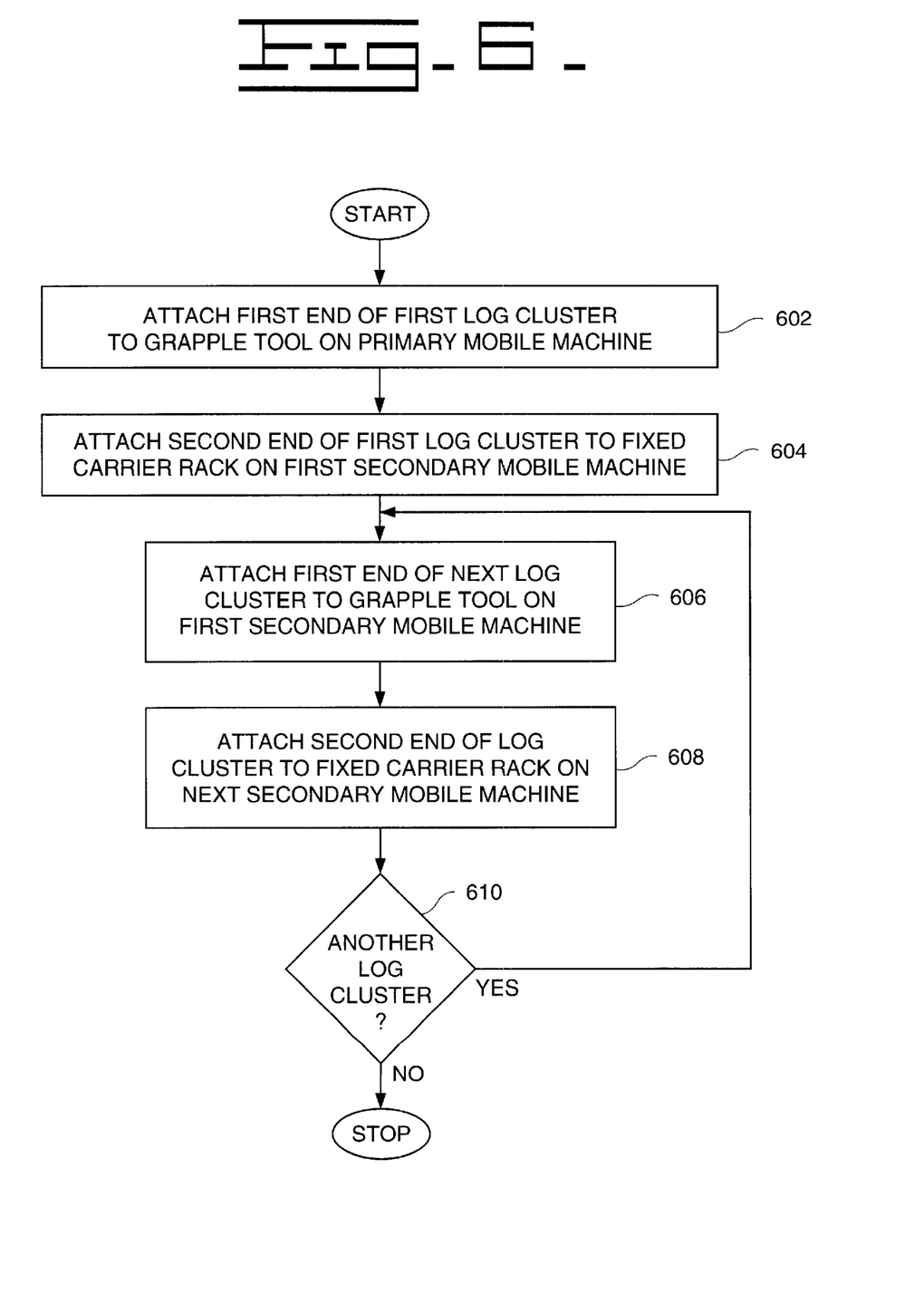
FIG. 6 is a flow diagram illustrating one aspect of a preferred method of the present invention.
Figure 7:
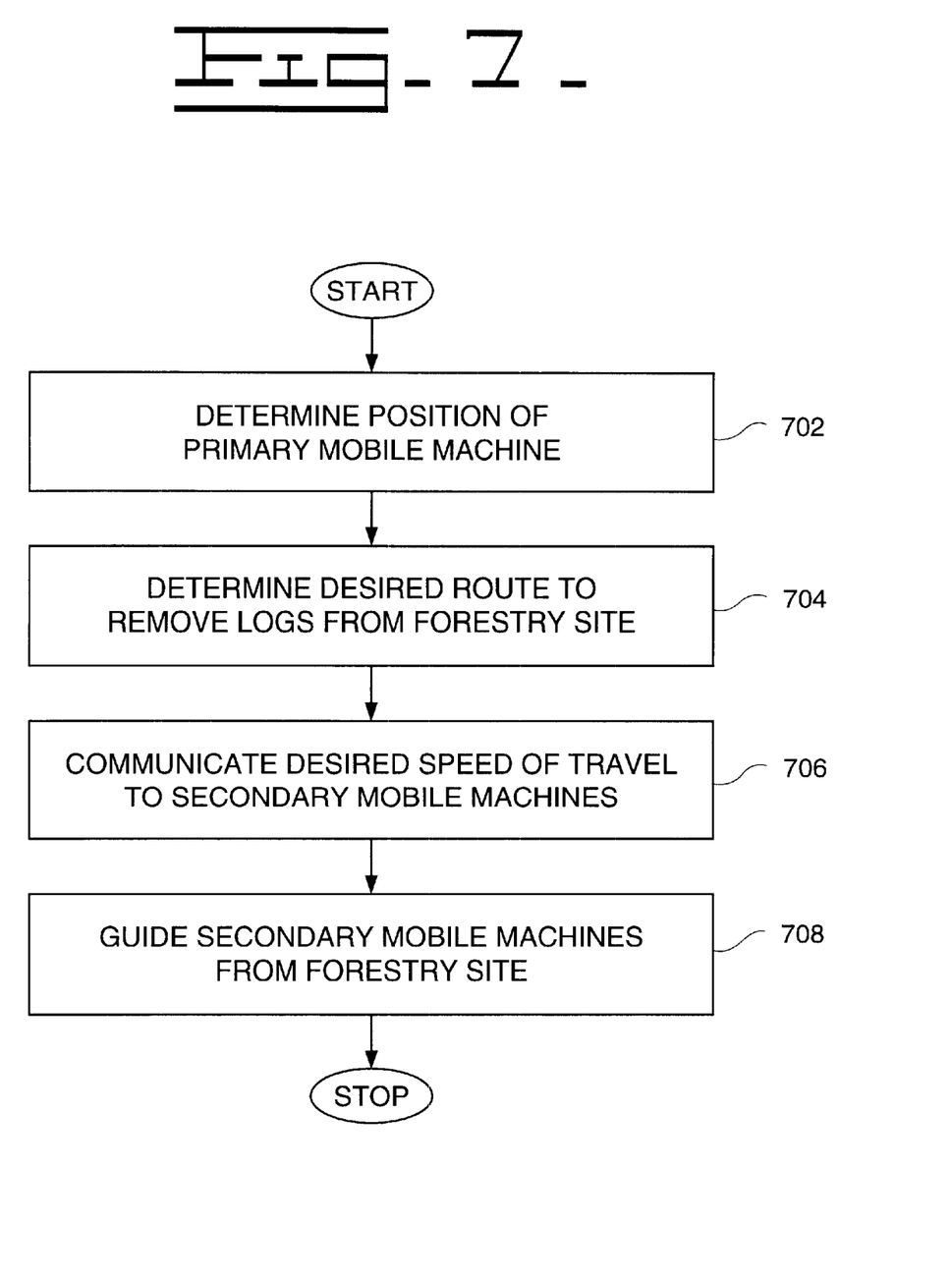
FIG. 7 is a flow diagram illustrating another aspect of a preferred method of the present invention.

Referring to FIG. 6, a flow diagram illustrating a preferred method of the present invention is shown. The flow diagrams of FIGS. 6 and 7 are described with reference to FIGS. 1, 2 and 5. More particularly, the flow diagram of FIG. 6 is described with reference to the embodiment depicted in FIGS. 1 and 2. It is noted that, although the flow diagram refers to grapple tools and fixed carrier racks, and FIGS. 1 and 2 illustrate this embodiment, alternative means for holding the log clusters 114, i.e., as described above, may be used as well.

In a first control block 602, a first end of a first log cluster 114a is attached to a grapple tool 108 located at a rearward portion 105 of the primary mobile machine 104.

In a second control block 604, a second end of the first log cluster 114a is attached to a fixed carrier rack 110a on a first end 109a, i.e., a forward portion, of a first secondary mobile machine 106a. Preferably, the grapple tool 108 on the primary mobile machine 104 is pivotally mounted, and the carrier rack 111a on the first secondary mobile machine 106a is mounted in a fixed position. Therefore, as the primary mobile machine 104 changes direction of travel, the first secondary mobile machine 106a is caused to change direction of travel as well.

In a third control block 606, a first end of a second log cluster 114b is attached to a grapple tool 112a located at a second end 111a, i.e., a rearward portion, of the first secondary mobile machine 106a.

In a fourth control block 608, a second end of the second log cluster 114b is attached to a fixed carrier rack 110b on a first end 109b, i.e., a forward portion, of a second secondary mobile machine 106b. Therefore, as the first secondary mobile machine 106a is caused to change direction of travel due to changes in travel of the primary mobile machine 104, the second secondary mobile machine 106b is also caused to change direction of travel. In this manner, the primary mobile machine 104 and the first and second secondary mobile machines 106a,106b travel in coordination, similar to the coordinated travel of a train.

Control proceeds to a first decision block 610, in which it is determined if additional log clusters 114 need to be attached to additional secondary mobile machines 106 for transport from the forestry site 102.

Referring to FIG. 7, a flow diagram illustrating another aspect of the present invention is shown. The flow diagram of FIG. 7 is described with reference to FIG. 5.

In a first control block 702, the position, in geographical coordinates, of the primary mobile machine 104 is determined.

In a second control block 704, a desired route to travel to remove the log clusters 114 from the forestry site 102 is determined. Preferably, the desired route is determined from a geographic information system (GIS) located on the primary mobile machine 104, in addition to information regarding the location of the primary mobile machine 104. The GIS includes geographic information of the forestry site 102.

In a third control block 706, a desired speed of travel is communicated by the primary mobile machine 104 to each of the secondary mobile machines 106. In the preferred embodiment, the desired speed of travel is a function of the condition of the terrain to be traversed, and of the amount of curvature of steering required. The speed of the primary mobile machine 104 and each of the secondary mobile machines 106 is coordinated so that the primary and secondary mobile machines 104,106 travel as one complete unit.

In a fourth control block 708, the secondary mobile machines 106, and therefore the log clusters 114, are guided from the forestry site 102 by the primary mobile machine 104.

INDUSTRIAL APPLICABILITY

As an example of an application of the present invention, logs are harvested at a forestry site 102 that is typically removed from roads capable of supporting log transport machines, e.g., logging trucks. Therefore, some suitable means must be used to transport the logs from the forestry site 102 to the log transport machines.

The present invention provides an efficient and economical apparatus and method for hauling logs from a forestry site which minimizes damage to the terrain and environment, and does not require the use of a road for transport.

Other aspects, objects, and features of the present invention can be obtained from a study of the drawings, the disclosure, and the appended claims.

What is claimed is:

1. An apparatus for removing logs from a forestry site, comprising:
    a primary mobile machine having means attached to a rearward portion thereof for holding a first end of a first log cluster;
    a first secondary mobile machine, including:
       a first end having means for holding a second end of the first log cluster; and
       a second end having means for holding a first end of a second log cluster;
    wherein the primary mobile machine and the first secondary mobile machine are interconnected by the first log cluster.

2. An apparatus, as set forth in claim 1, further comprising:
    a second secondary mobile machine, including:
       a first end having means for holding a second end of the second log cluster; and
       a second end having means for holding a first end of a third log cluster;
    wherein the first secondary mobile machine and the second secondary mobile machine are interconnected by the second log cluster.

3. An apparatus, as set forth in claim 2, wherein the primary mobile machine is adapted to guide the first and second secondary mobile machines from the forestry site.

4. An apparatus for removing logs from a forestry site, comprising:
    a primary mobile machine having a grapple tool pivotally attached to a rearward portion thereof, the grapple tool being adapted to hold a first end of a first log cluster;
    a first secondary mobile machine, including:
       a first end having a fixed carrier rack connected, the fixed carrier rack being adapted to hold a second end of the first log cluster; and
       a second end having a grapple tool pivotally connected, the grapple tool being adapted to hold a first end of a second log cluster;
    wherein the primary mobile machine and the first secondary mobile machine are interconnected by the first log cluster.

5. An apparatus, as set forth in claim 4, further comprising:
    a second secondary mobile machine, including:
       a first end having a fixed carrier rack connected, the fixed carrier rack being adapted to hold a second end of the second log cluster; and
       a second end having a grapple tool pivotally connected, the grapple tool being adapted to hold a first end of a third log cluster;
    wherein the first secondary mobile machine and the second secondary mobile machine are interconnected by the second log cluster.

6. An apparatus, as set forth in claim 4, wherein the primary mobile machine includes an engine for propulsion, and a steering system.

7. An apparatus, as set forth in claim 6, wherein the primary mobile machine is a track-type machine, having a left track and a right track, the left and right tracks being drivably connected to the engine and controllably connected to the steering system.

8. An apparatus, as set forth in claim 4, wherein the primary mobile machine is a manned mobile machine.

9. An apparatus, as set forth in claim 5, wherein the primary mobile machine includes:
    a position determining system;
    a geographic information system having a database for storing geographic information of the forestry site;
    a communications system adapted for communicating with the secondary mobile machines; and
    a processor adapted for receiving position information from the position determining system, determining a desired route to traverse from the geographic information system, and communicating commands to the secondary mobile machines.

10. An apparatus, as set forth in claim 5, wherein each secondary mobile machine includes an engine for propulsion.

11. An apparatus, as set forth in claim 10, wherein each secondary mobile machine is a track-type machine, having a center track drivably connected to the engine.

12. An apparatus, as set forth in claim 5, wherein each secondary mobile machine is an unmanned mobile machine.

13. An apparatus, as set forth in claim 9, wherein each secondary mobile machine is guided by the primary mobile machine by means of an interconnected log cluster.

14. An apparatus, as set forth in claim 13, wherein each secondary mobile machine includes a communications system adapted for receiving commands from the primary mobile machine, the commands being determinative of a desired speed of travel.

15. An apparatus, as set forth in claim 5, wherein each log cluster includes at least one log.

16. An apparatus for removing logs from a forestry site, comprising:
    a primary mobile machine having a grapple tool pivotally attached to a rearward portion thereof, the grapple tool being adapted to hold a first end of a log cluster; and
    a plurality of secondary mobile machines, each secondary mobile machine including:
       a first end having a fixed carrier rack connected, the fixed carrier rack being adapted to hold a second end of a log cluster preceding the secondary mobile machine; and
       a second end having a grapple tool pivotally connected, the grapple tool being adapted to hold a first end of another log cluster following the secondary mobile machine;
    wherein the primary mobile machine and each of the secondary mobile machines are interconnected by the log clusters.

17. An apparatus, as set forth in claim 16, wherein the primary mobile machine includes an engine and a steering system, each secondary mobile machine includes an engine, and the primary mobile machine is adapted to guide the secondary mobile machines from the forestry site by means of the interconnected log clusters.

18. An apparatus, as set forth in claim 17, wherein the primary mobile machine further includes:

a position determining system;

a geographic information system;

a communications system; and a processor adapted for receiving position information from the position determining system, determining a desired route to traverse from the geographic information system, and communicating commands to the secondary mobile machines.

19. An apparatus, as set forth in claim 18, wherein each secondary mobile machine includes an engine for propulsion, and a communications system adapted for receiving commands from the primary mobile machine, the commands being determinative of a desired speed of travel.

20. A primary mobile machine for guiding a plurality of secondary mobile machines from a forestry site, comprising:

a grapple tool pivotally attached to a rearward portion of the primary mobile machine, the grapple tool being adapted to hold a first end of a first log cluster;

an engine for propulsion;

a steering system;

a plurality of ground engaging members drivably connected to the engine, and controllably connected to the steering system;

a position determining system;

a geographic information system;

a communications system; and a processor adapted for receiving position information from the position determining system, determining a desired route to traverse from the geographic information system, and communicating commands to the secondary mobile machines.

21. A primary mobile machine, as set forth in claim 20, wherein the primary mobile machine is a track-type machine, and wherein the plurality of ground engaging members includes a left track and a right track.

22. A primary mobile machine, as set forth in claim 20, wherein the primary mobile machine is a wheel-type machine, and wherein the plurality of ground engaging members includes a plurality of wheels.

23. A primary mobile machine, as set forth in claim 20, wherein the primary mobile machine is adapted to be interconnected to the plurality of secondary mobile machines by means of a plurality of log clusters, the first log cluster being attached at the first end to the primary mobile machine and at a second end to a secondary mobile machine, and each other log cluster being attached at a first end to a secondary mobile machine and at a second end to another secondary mobile machine.

24. A primary mobile machine, as set forth in claim 20, wherein the communicated commands to the secondary mobile machines are commands determinative of a desired speed of travel of each of the secondary mobile machines.

25. A secondary mobile machine for removing logs from a forestry site, comprising:

a first end having a fixed carrier rack connected, the fixed carrier rack being adapted to hold an end of a first log cluster forward of the secondary mobile machine;

a second end having a grapple tool pivotally connected, the grapple tool being adapted to hold an end of a second log cluster rearward of the secondary mobile machine;

an engine for propulsion;

at least one ground engaging member drivably connected to the engine; and a communications system located on the secondary mobile machine and adapted to receive desired speed commands from a primary mobile machine;

wherein the secondary mobile machine is adapted to be interconnected to the primary mobile machine by means of the first log cluster forward of the secondary mobile machine, and the secondary mobile machine is adapted to be guided from the forestry site by the primary mobile machine.

26. A secondary mobile machine, as set forth in claim 25, further including a plurality of secondary mobile machines, each secondary mobile machine being adapted to be interconnected to another secondary mobile machine by means of one of a plurality of log clusters.

27. A secondary mobile machine, as set forth in claim 26, wherein the secondary mobile machine is a track-type machine, and wherein the at least one ground engaging member includes a center track.

28. A secondary mobile machine, as set forth in claim 26, wherein the secondary mobile machine is a wheel-type machine, and wherein the at least one ground engaging member includes a set of wheels.

29. A method for removing logs from a forestry site, including the steps of:

a) attaching a first end of a first log cluster to a grapple tool pivotally connected to a rearward portion of a primary mobile machine;

b) attaching a second end of the first log cluster to a fixed carrier rack connected to a forward portion of a first secondary mobile machine;

c) attaching a first end of a second log cluster to a grapple tool pivotally connected to a rearward portion of the first secondary mobile machine;

d) attaching a second end of the second log cluster to a fixed carrier rack connected to a forward portion of a second secondary mobile machine; and e) repeating steps c) and d) for each additional log cluster, using additional secondary mobile machines.

30. A method, as set forth in claim 29, further including the steps of:

determining in geographical coordinates a position of the primary mobile machine;

determining a desired route to remove the logs from the forestry site, the desired route being determined from a geographic information system having geographic information of the forestry site;

communicating a desired speed of travel by the primary mobile machine to each of the secondary mobile machines; and guiding the secondary mobile machines from the forestry site by means of the primary mobile machine.

31. A method, as set forth in claim 29, wherein each log cluster includes at least one log.

32. A method, as set forth in claim 31, wherein each log in a log cluster is substantially the same length as each other log in the log cluster.

* * * * *